United States Patent [19]
Hutchings et al.

[11] Patent Number: 5,720,486
[45] Date of Patent: Feb. 24, 1998

[54] SELF-FORMED LABYRINTH SEAL

[75] Inventors: William J. Hutchings, Fairport;
Stephen L. Markle, Holles; David J. Engel, Springwater; Joel S. Berg, Hilton, all of N.Y.

[73] Assignee: General Signal Corporation, Rochester, N.Y.

[21] Appl. No.: 739,740

[22] Filed: Nov. 7, 1996

[51] Int. Cl.[6] ........................ F16J 15/34
[52] U.S. Cl. ............... 277/1; 277/57; 277/96.1
[58] Field of Search ................ 277/1, 53, 57, 277/96, 96.1; 384/139, 140, 144, 480, 481; 366/279

[56] References Cited

U.S. PATENT DOCUMENTS

| | | | |
|---|---|---|---|
| 1,872,251 | 8/1932 | Cowin | 277/57 |
| 2,336,323 | 12/1943 | Warren | 277/53 |
| 2,668,068 | 2/1954 | Bredemeir | 277/96 |
| 3,602,559 | 8/1971 | Hirschler | 277/57 |
| 3,715,147 | 2/1973 | Zahn | 384/481 |
| 4,383,768 | 5/1983 | Kupka . | |
| 4,753,534 | 6/1988 | Markle . | |
| 4,856,916 | 8/1989 | Ito et al. | 277/96.1 |
| 4,955,462 | 9/1990 | Bilodeau et al. | 277/57 |
| 5,025,917 | 6/1991 | Smith et al. | 377/57 |
| 5,040,899 | 8/1991 | Koskinen . | |
| 5,575,486 | 11/1996 | Edling et al. | 277/96 |

FOREIGN PATENT DOCUMENTS

| | | | |
|---|---|---|---|
| 2273973 | 1/1976 | France | 384/480 |
| 854298 | 11/1952 | Germany | 384/480 |
| 115662 | 9/1980 | Japan | 277/96.1 |
| 1026007 | 4/1966 | United Kingdom | 384/480 |

*Primary Examiner*—Scott Cummings
*Attorney, Agent, or Firm*—M. Lukacher

[57] ABSTRACT

A labyrinth shaft seal for preventing the migration of gear lubricant from a mixer drive assembly into a batch of process materials being mixed. In the preferred embodiment, a portion of the gearcase outboard of the upper quill bearing, preferably the actual bearing mount, is provided with an axially-directed circular face, the mount being formed of relatively soft material such as ductile cast iron. A disc-shaped seal element having a central aperture and supporting an axially-directed peripheral cylindrical flange is sealingly mounted on the quill above the quill bearing and extends radially from the quill and generally parallel to the circular face. The flange is formed of material substantially harder than the circular face. The axial positions of the outer bearing race mount on the housing and the disc-shaped seal element on the quill are selected so that, upon assembly of the bearings and seal, the lower edge of the flange interferes with the circular surface causing the disc-shaped seal element to be elastically deformed to define a dish-shaped spring having a depth of 0.010 inch. Upon rotation of the quill, the flange is urged by the pre-load of the spring to incise and then occupy an interference-fit groove in the circular surface, thereby forming an inexpensive, and effective labyrinth seal against leakage of gear lubricant through the quill bearing.

5 Claims, 3 Drawing Sheets

5,720,486

SELF-FORMED LABYRINTH SEAL

The present invention relates to dynamic seals for rotating shafts, more particularly to seals for sealing driven mixer shafts in vessels, and most particularly to shaft seals for preventing the intermixing of mixer drive gearcase lubricant with process fluids being mixed by a mixer.

A drive assembly for rotationally driving a mixer shaft in a vessel typically includes a gearcase or gearbox containing a train of gears and transmission shafts for connecting operationally the output shaft of an electric drive motor with the mixer shaft extending into the vessel. Typically, the mixer shaft itself is rigidly centered and retained for rotation in a rotationally-driveable "quill" which includes an equatorial ring gear as the ultimate gear in the train. The rotatable quill in a stationary housing defines "rotary joint." Generally, the gears in the gearcase are immersed in oil. Two problems in the art of mixer drives are a) how to prevent gearcase lubricant from migrating along the quill or shaft and contaminating process fluids being mixed, and b) how to prevent process fluids from migrating along the quill to contaminate and potentially damage the quill bearings and the gear train in the gearcase.

Dynamic shaft seals are known in the art. For example, radial-face shaft seals including packing rings and slide ring sealings similar to those used in the pump industry are disclosed in U.S. Pat. Nos. 4,383,768 issued May 17, 1983 to Kupka, and 5,040,899 issued Aug. 20, 1991 to Koskinen, respectively. The sealing elements are stationary and are axially compressed so that they exert radial pressure on the surface of a rotating shaft or quill. U.S. Pat. No. 4,753,534 issued Jun. 28, 1988 to Markle discloses an axial-face seal wherein an axially-loaded carbon seal ring rotatable with the quill forms a seal against a hardened surface of a stationary seal seat. Wear of either of these types of shaft seals can permit gearcase lubricant to pass through the seal and enter the process batch, and vice-versa.

Thus a need exists for an improved positive shaft seal which is not subject to increasing operating tolerances with use.

It is a principal object of the invention to provide an improved shaft seal which generates through use its own permanent interference seal.

It is a further object of the invention to provide an improved shaft seal apparatus which creates a labyrinth seal inherently by the rotation of the sealing elements against each other.

Briefly described, a mixer system for dynamically sealing against leakage by a rotating shaft or quill in a stationary housing has a first sealing element comprising a relatively soft sealing surface disposed axially, either for rotation with a shaft or stationary with the shaft support. A generally disc- or ring-shaped second sealing element is disposed on the shaft, either stationary or rotating in complement to the first sealing element and generally parallel thereto. The second sealing element is formed preferably of hardened steel and has a cylindrical flange of short axial length in contact with the first sealing surface. Upon assembly of the Seal, the ring-shaped element is axially pre-loaded to a slight dish shape, similarly to a Belville washer, so that an axial force is exerted by the flange on the sealing surface. Because of the difference in hardness between the flange and the sealing surface, upon rotation of the shaft the flange begins to wear an interference-fit circular groove in the surface, concomitantly relieving the axial pre-stress. At maximum wear, the flange has an interference fit on the inside, the bottom, and the outside of the flange, forming an interference labyrinth seal and the pre-stress is partially relieved. At low to modest pressures across the labyrinth, such as exist in a gearcase, passage of liquids is prevented.

In a further embodiment of the invention, upper and lower bearings rotationally supporting a mixer quill in a gearcase are lubricated with high-viscosity grease and are isolated from the lubricating oil in the mixer gearbox by a seal in accordance with the invention. The grease is too stiff to migrate down the mixer shaft into the process batch, and the oil in the gearcase cannot migrate across the seal and dilute the grease in the bearings.

A seal in accordance with the invention can be used as shown and described in detail herein to prevent gearcase lubricant from entering the quill bearings, but of course such a seal is also useful in preventing process fluids being mixed from migrating along the mixer shaft and into the quill bearings.

The foregoing and other objects, features, and advantages of the invention, as well as presently preferred embodiments thereof, will become more apparent from a reading of the following description in connection with the accompanying drawings in which.

Figure 1:
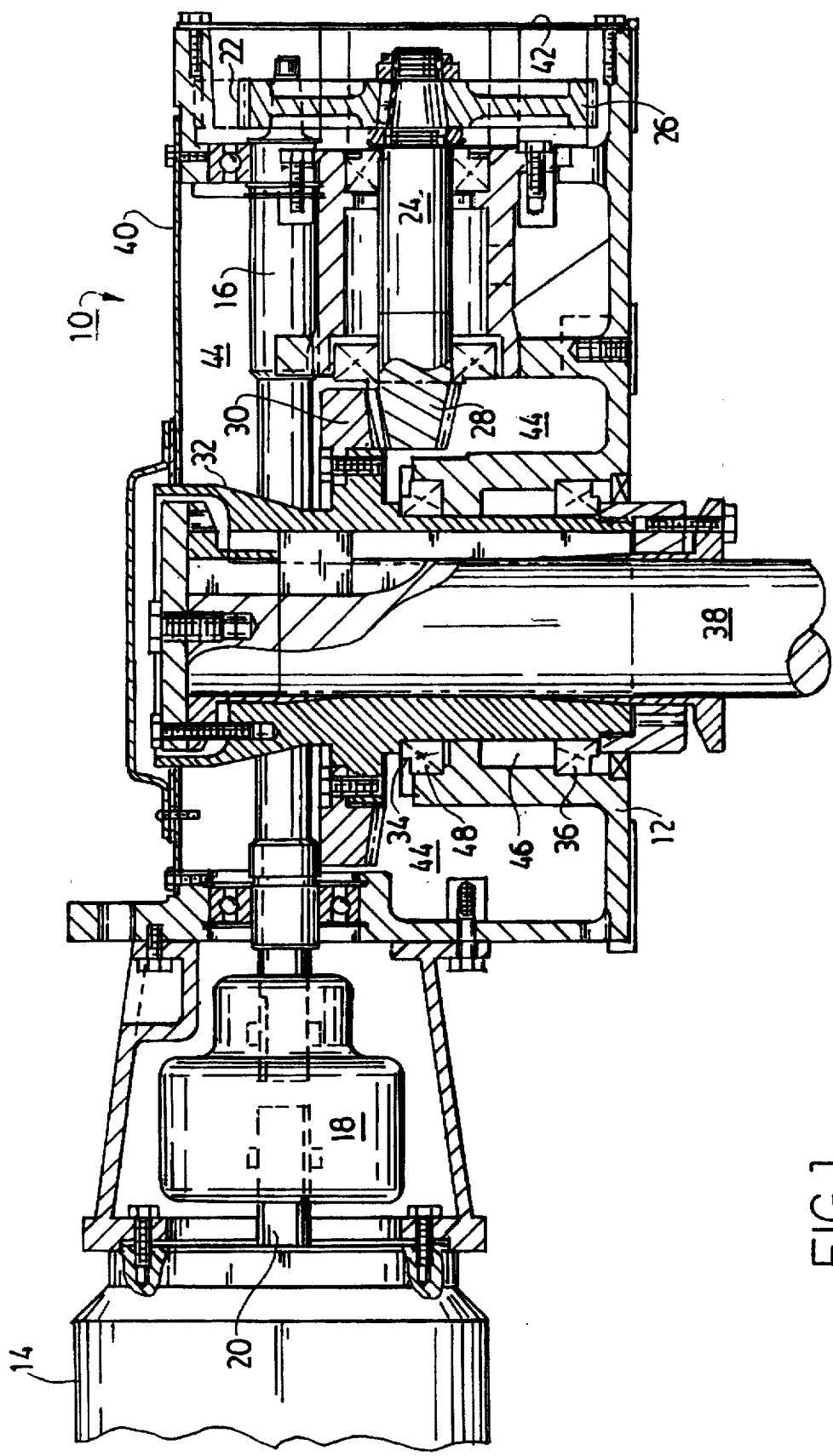
FIG. 1 is an elevational view, partially in cross-section, of a mixer drive assembly incorporating a seal in accordance with the invention.
Figure 2:
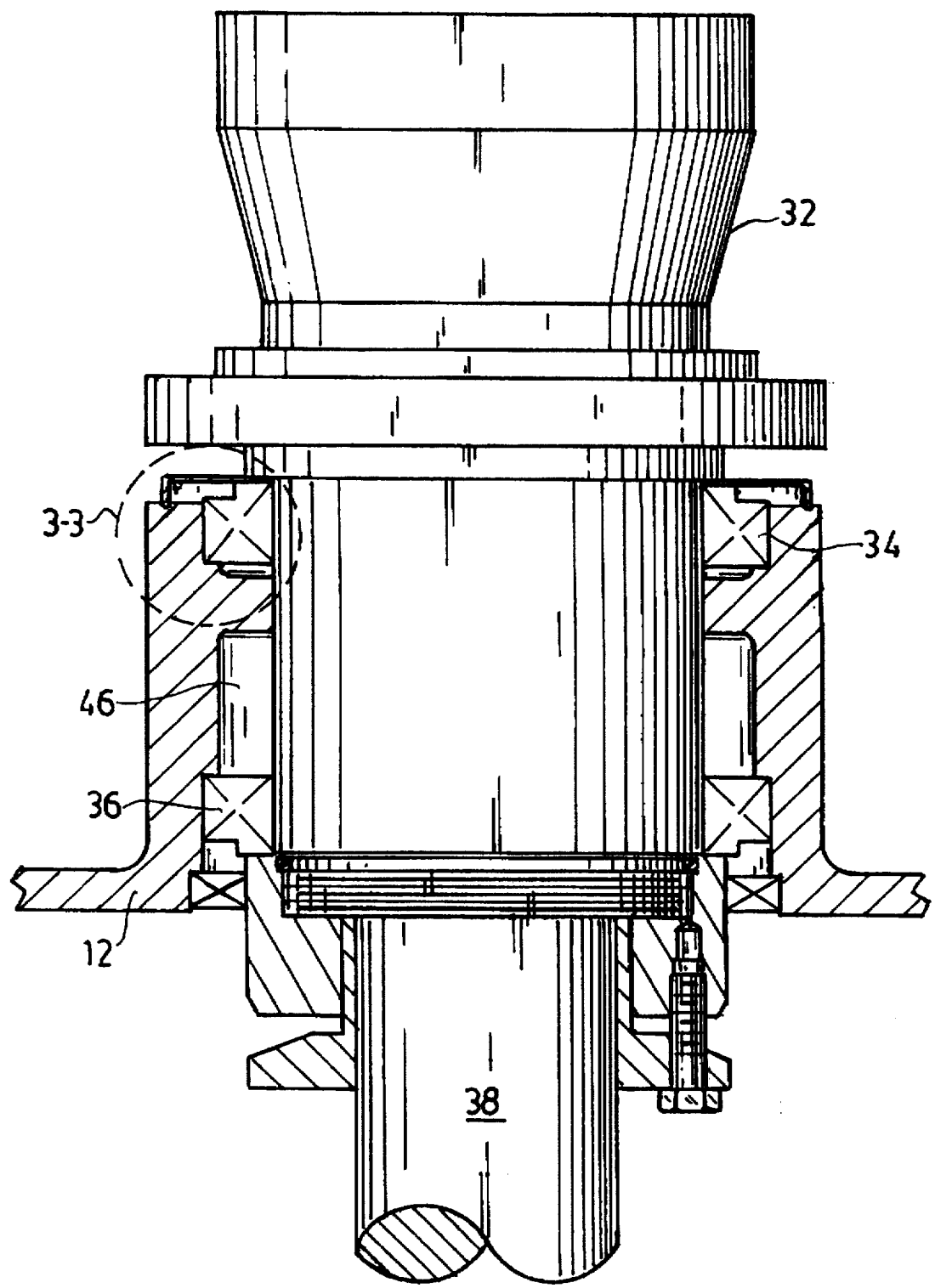
FIG. 2 is an enlarged elevational view of a central portion of the mixer drive assembly shown in FIG. 1, showing the relationship of the seal to the quill and the quill bearings.

Referring to FIGS. 1 through 4, there is shown a mixer drive assembly 10 for transmitting torque via gear reduction from an electric motor to a mixer shaft. Assembly 10 includes a gearbox or housing 12 supporting a conventional electric motor 14, for example, a NEMA C-face motor. Housing 12 is preferably a ductile iron casting having a hardness of about 150 Brinell. Housing 12 rotatably supports a gear train comprising a first cross-shaft 16 connected via coupling 18 to motor shaft 20; a pinion gear 22 on first shaft 16; a rotatably mounted second cross-shaft 24 supporting a drive gear 26, meshing with pinion gear 22, and a bevel-cut pinion gear 28, meshing with a bevel-cut ring gear 30 equatorially disposed on quill 32. Quill 32 is rotatably mounted in upper and lower quill bearings 34 and 36, respectively. A mixer shaft 38 is rigidly centered and retained within quill 32. Housing 12 is closed by a sealed top cover 40 and a sealed end plate 42, and is substantially or nearly filled with oil lubricant 44 so that all the rotating and meshing components just enumerated, except for the quill bearings 34 and 36, are bathed in oil during operation of the mixer drive assembly.

Quill bearings 34 and 36 are packed with high viscosity grease and preferably have an airspace 46 therebetween, the combination of bearings and airspace being known as a "dry well." Upper bearing 34 is supported in a bearing mount 48 in housing 12 having a step 50 which governs the axial location of the bearing 34. Bearing 34 includes an outer race 52 and an inner race 54, the outer race being stationary and sealingly disposed in bearing mount 48, and the inner race being sealingly mounted on and turnable with quill 32. Bearing mount 48 is provided with a planar axial upper surface 49 which is one of the sealing elements of a seal in accordance with the invention.

Figure 3:
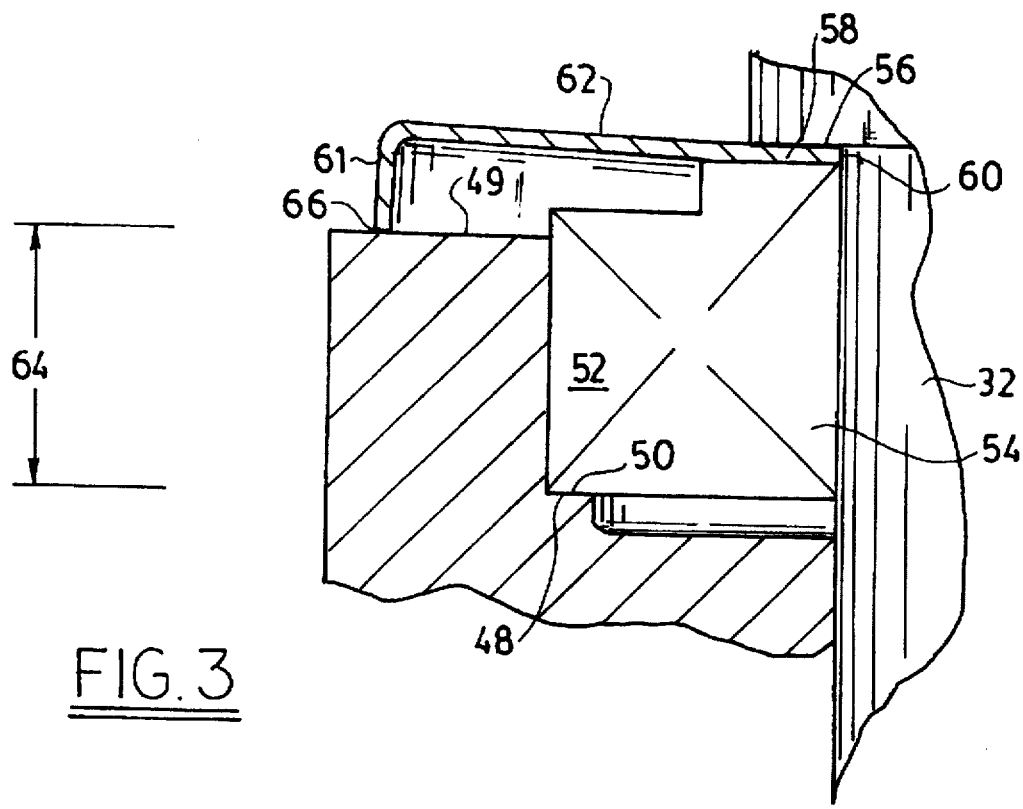
FIG. 3 is a further enlarged cross-section of the upper quill bearing shown in FIGS. 1 and 2, showing the pre-stress on the sealing ring and flange at assembly.
Figure 4:
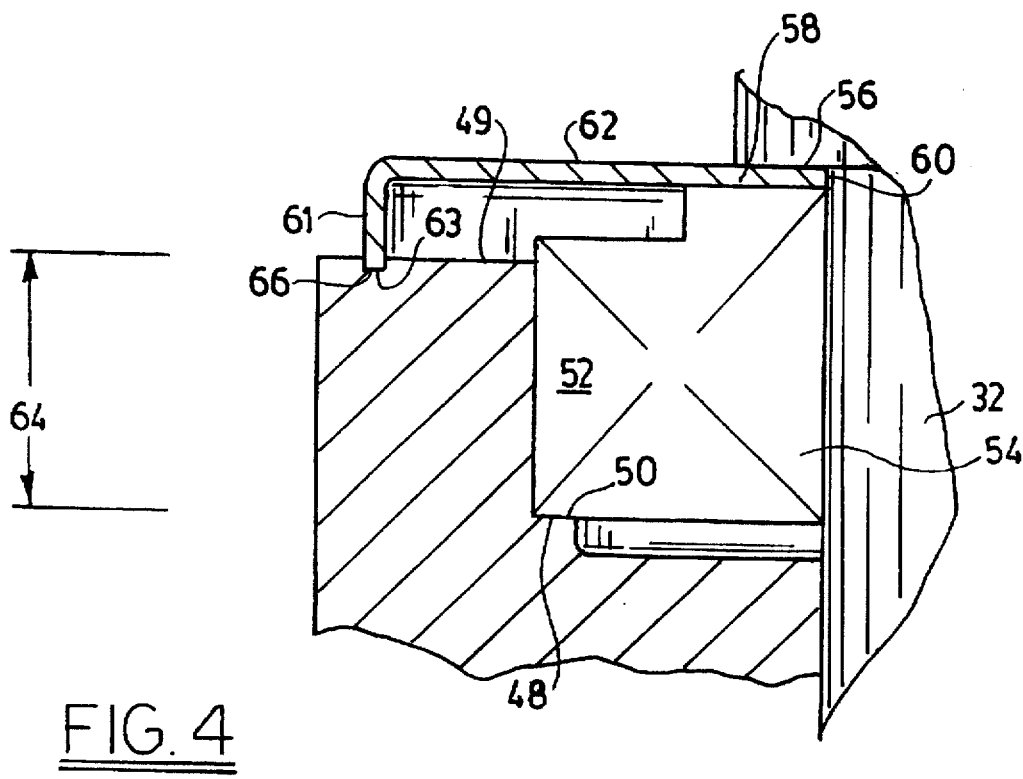
FIG. 4 is a view like that shown in FIG. 3, showing the flange at equilibrium, having formed a labyrinth seal.

Inner race 54 is located axially by a step 56 in the quill. Between race 54 and step 56 is captured a labyrinth seal element 58, being a generally circular element formed, for example, by punching from a sheet of steel stock preferably about 0.030-inch thick. Mild hardness steel is presently preferred. Seal element 58 has a central aperture 60 substantially the same as the inner diameter of race 54, so that both can be slid along the quill from the lower end into proper location shown in FIGS. 3 and 4. Element 58 further has a peripheral flange 61 extending substantially axially to and orthogonally from the radial portion 62 thereof. The depth 64 of step 50 from sealing surface 49 is selected so that, upon assembly of the quill and bearings in the housing, the lower end 66 of flange 61 interferes with surface 49 and element 58 becomes dished by between about 0.003-inch and 0.050-inch, preferably about 0.010-inch, as shown in FIG. 3. The peripheral flange is thus urged against the sealing surface under a pre-load.

When the mixer begins operation, the pre-loaded hardened steel flange begins to wear a groove 63 exactly the size of the flange into the cast ductile iron of surface 49. As it does so, the pre-load is gradually diminished, until at equilibrium the lower end of 66 extends into a mating groove in surface 49, forming an interference-fit labyrinth seal. The seal is formed automatically and inexpensively by the cutting action of the flange on the surface. A perfect fit of the groove to the flange is obtained simply and without resort to costly precision machining of these parts. Since the flange is selected to be harder than the surface 49, further running of the mixer produces no further wear of either seal component and no significant degradation in the effectiveness of the seal.

Only a single labyrinth is shown in this preferred embodiment, but multiple labyrinths can be provided as desired within the scope of the invention by providing additional concentric flanges extending within flange 61 from the underside of element 58. The annular cavity defined by the element 58 and the surface 49 and the bearing 34 may be filled with grease to further enhance the seal. The step at the upper end of the bearing 34 also presents a barrier and provides a sealing effect.

In the preferred embodiment, the flange is rotatable and the sealing surface is stationary. Other configurations in other applications are possible, of course, for example, the flange may be stationary and the sealing surface rotatable; and the flange may be provided on the bearing mount, and an appropriate sealing surface provided on the quill. All such configurations are fully within the scope of the invention.

From the foregoing description it will be apparent that there has been provided an improved dynamic shaft seal, wherein a durable seal element is pre-loaded to run against a softer sealing surface and thereby to wear an interference-fit labyrinth seal groove in the softer material. Variations and modifications of the herein described labyrinth seal, in accordance with the invention, will undoubtedly suggest themselves, to those skilled in this art. Accordingly, the foregoing description should be taken as illustrative and not in a limiting sense.

What is claimed is:

1. A self-forming labyrinth seal for preventing leakage of fluids along a rotatable shaft in a stationary housing, the shaft being supported by bearings in races disposed in the housing, comprising:

a) a first sealing element having an axially-directed circular face on a surface of said housing radially extensive beyond said bearing races, said first element having a first hardness; and b) a second sealing element disposed for rotation with said shaft and having a radially-directed portion supporting a cylindrical axially-directed portion in contact with said circular face on said first sealing element, said radially-directed portion being axially-deformable to define a spring to urge said cylindrical portion against said circular face, said cylindrical portion having a second hardness, and said second hardness being greater than said first hardness.

2. A seal in accordance with claim 1 wherein said housing is a housing for a mixer drive gearcase.

3. A seal in accordance with claim 1 wherein said spring deformation is between about 0.003 inches and 0.050 inches.

4. A seal in accordance with claim 1 wherein said bearings include a drywell airspace, and wherein said seal is disposed between said fluids and said drywell airspace to prevent the ingress of fluids to, and the escape of air from, said bearings.

5. A method for forming a labyrinth seal for preventing leakage of fluids along a rotatable shaft in a stationary housing, the shaft being supported by bearings in races disposed in the housing, comprising the steps of:

a) providing a first sealing element having an axially-directed circular face on a surface of said housing radially extensive beyond said bearing races, said first element having a first hardness;

b) providing a second sealing element disposed for rotation with said shaft and having a radially-directed portion supporting a cylindrical axially-directed portion in initial contact along its lower edge with said circular face on said first sealing element, said cylindrical portion having a second hardness, and said second hardness being greater than said first hardness;

c) axially deforming said radially-directed portion to define a spring to urge said cylindrical portion against said circular face; and d) rotating said shaft to cause said cylindrical portion to incise and occupy an interference-fit mating groove in said housing face, said cylindrical portion and said mating groove thereafter defining a labyrinth seal.

\* \* \* \* \*